United States Patent [19]

Ochi et al.

[11] Patent Number: 4,980,589
[45] Date of Patent: Dec. 25, 1990

[54] VEHICLE ALTERNATOR WITH ADAPTABLE MOUNTING BRACKET

[75] Inventors: Daisuke Ochi; Yasuhiro Yoshida, both of Hyogo, Japan

[73] Assignee: Mitsubishi Denki Kabushiki Kaisha, Tokyo, Japan

[21] Appl. No.: 410,452

[22] Filed: Sep. 21, 1989

[30] Foreign Application Priority Data

Sep. 21, 1988 [JP] Japan .............. 63-123719[U]

[51] Int. Cl.⁵ .............................. H02K 5/06
[52] U.S. Cl. .................. 310/68 D; 248/674; 310/91
[58] Field of Search ............ 248/637, 674; 310/68 R, 310/68 D, 89, 90, 91

[56] References Cited

U.S. PATENT DOCUMENTS

| | | | |
|---|---|---|---|
| 3,983,429 | 9/1976 | Allardice, Jr. | 310/91 |
| 4,636,673 | 1/1987 | McDonald | 310/91 |
| 4,835,428 | 5/1989 | Komurasaki et al. | 310/68 D |
| 4,849,665 | 7/1989 | Kitamura et al. | 310/68 D |
| 4,899,703 | 2/1990 | Buferne | 248/674 |

FOREIGN PATENT DOCUMENTS

WO8500936 2/1985 PCT Int'l Appl. .
WO8602788 5/1986 PCT Int'l Appl. .
2184611 6/1988 United Kingdom .

Primary Examiner—Peter S. Wong
Assistant Examiner—D. L. Rebsch
Attorney, Agent, or Firm—Sughrue, Mion, Zinn, Macpeak and Seas

[57] ABSTRACT

A vehicle alternator comprises a pair of brackets for holding front and rear portions of a stator 5, the front bracket 1 having projecting flanges 21a, 21b at respective vertical ends while the rear bracket 6 has a projecting flange 8 at one vertical end. A pair of separate mounting pieces 22a, 22b are provided for attaching the alternator to the engine via the bracket flanges. The mounting pieces have attachment bosses 41 with holes 31, and one of the mounting pieces is provided with bosses at both horizontal ends for connecting the brackets to each other at the flanges.

4 Claims, 3 Drawing Sheets

VEHICLE ALTERNATOR WITH ADAPTABLE MOUNTING BRACKET

BACKGROUND OF THE INVENTION

1. Field of the Invention

The present invention relates to a vehicle alternator, and more particularly to a structure for mounting a vehicle alternator to an engine.

2. Description of the Prior Art

The appearance of a vehicle alternator in the prior art is shown in FIG. 4 in which there is found a front bracket 1 with upper and lower flanges 2a, 2b projecting therefrom. Bosses 4a, 4b are formed in the lower flange 2a and a boss 4c is formed in the upper flange 2b. Each of the bosses 4a, 4b, 4c is respectively provided with attachment bores 3a, 3b, 3c extending in a direction at right angles to the axial direction of the alternator. The bolts inserted through these attachment bores 3a, 3b, 3c are screwed tightly to mount the vehicle alternator firmly to an engine. Reference numeral 5 denotes a stator partially fitted in the front and rear brackets 1 and 6 and held securely therebetween by means of the bolts 7. The flange 8 integrally formed on the rear bracket 6 is fastened by means of a bush 9 and a bolt 10 to the lower flange 2a which is protrudingly formed on the lower portion of the front bracket 1. Pulley 11, in combination with a belt, transmits rotation of the engine to the rotor rotatably supported inside the vehicle alternator.

In the prior art structure described above, the front bracket 1 and the rear bracket 6 are usually cast in a casting process and then the portions required to be accurate in dimension such as the aforesaid attachment bores 3a, 3b, 3c, and bosses 4a, 4b, 4c are adjusted by machining operations. However, casting the substantially long or thick articles is likely to cause problems such as blisters or inverted blisters (dimples) therein, and further, the machining process in different directions can result in lower efficiency.

In the prior art apparatus, particularly the lower flange 2a may be cast with blisters or inverted blisters if it has a long pitch or span between the attachment bores 3a and 3b. Furthermore, since the bores 3a, 3b, 3c and bosses 4a, 4b, 4c are machined in a direction at right angles to the alternator axis while other parts in the both brackets 1 and 6, such as the through-holes through which the bolts 7 are inserted and fitting portions into which the stator 5 is fitted, are machined in the axial direction, low machining efficiency results, and poor dimensional accuracy as well, due to the frequent chucking operations. Besides, the attachment bores 3a, 3b, 3c and bosses 4a, 4b, 4c are provided in the front bracket 1, and owing to this, if the corresponding pitch at the engine site is different from that of the alternator site, the front and rear brackets 1 and 6 must be manufactured in accordance with the corresponding mounting pitch at the engine side.

As described above, the prior art vehicle alternator has disadvantages such as remarkably reduced excitation intensity resulting from the occurrence of blisters or inverted blisters in its casting process, and variation in the center of the pulley due to the poor dimensional accuracy in its machining process, which is observed when the alternator is mounted to the engine and rotated. Another problem is that each time an alteration in the mounting pitch of the engine site is made, brackets to be used exclusively for each engine must be manufactured, causing an increase in the number of types of apparatus, and difficult standardization thereof.

SUMMARY OF THE INVENTION

The present invention has been accomplished to solve the problems or difficulty mentioned above, and its principal object is to provide a vehicle alternator having improved mechanical strength and which can be manufactured with increased efficiency and accuracy of machining.

The vehicle alternator according to the present invention comprises mounting pieces each having bosses for mounting the alternator to an engine and fastened with screws to the projecting flanges of the brackets.

In this invention, these bosses for mounting the alternator to an engine are provided in independent mounting pieces separate from the brackets of the alternator, and by virtue of this, the alternator brackets are not required to be too long or too thick. Another feature is that the attachment bosses and brackets can be manufactured in respective processes without necessitating machining operations in different directions. A further feature is that only the mounting pieces having bosses need be replaced with those of other sizes if the mounting pitch between the bosses does not coincide with the corresponding pitch at the engine site.

Other objects and features of the invention will be more fully understood from the following detailed description and appended claims when taken with the accompanying drawings.

DETAILED DESCRIPTION OF THE PREFERRED EMBODIMENTS

Figure 1:
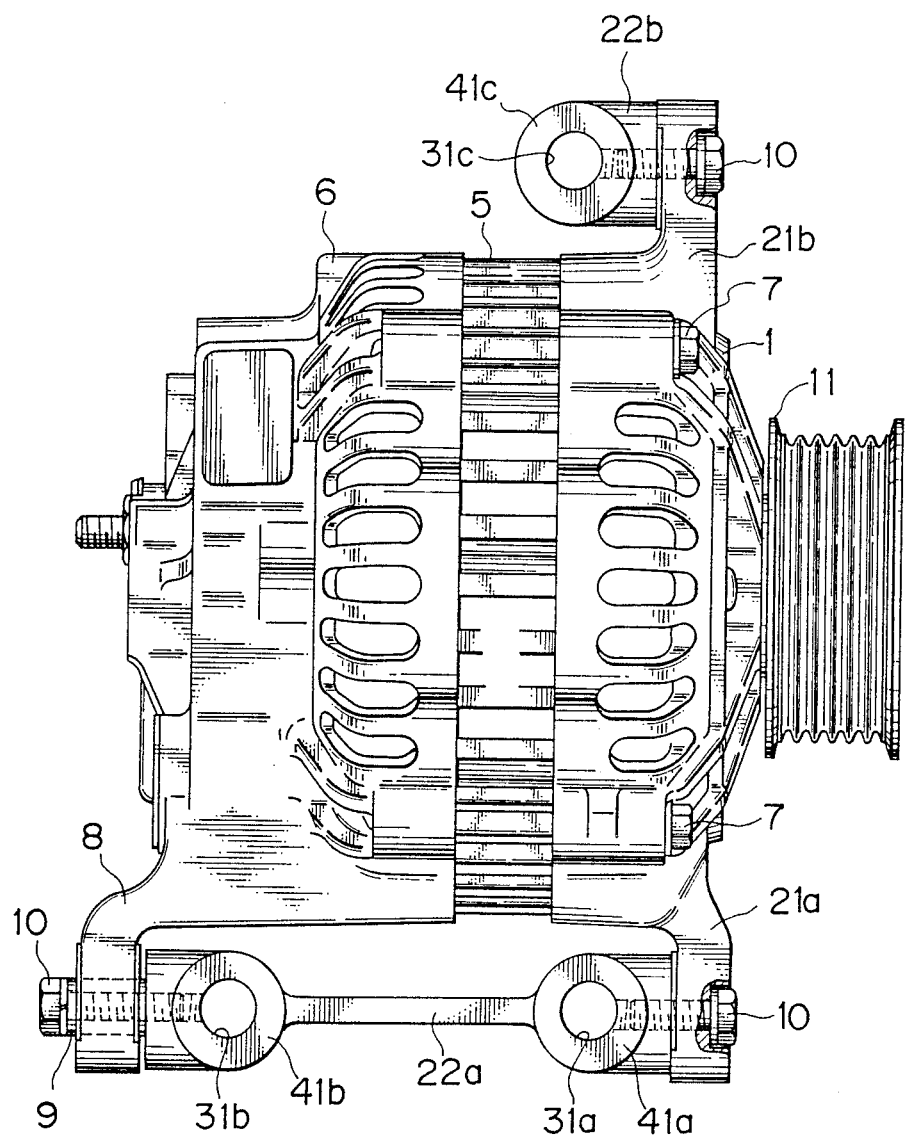
FIGS. 1 and 2 are front and partial side views of a first embodiment of a vehicle alternator according to the present invention, respectively.
Figure 2:
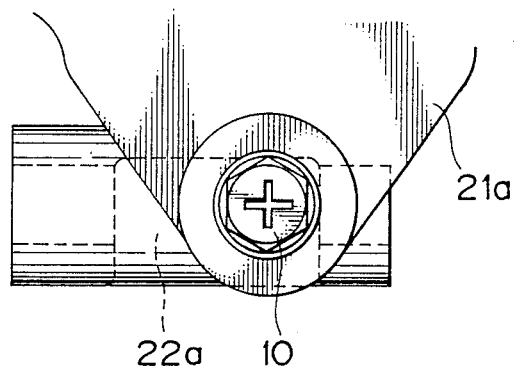

There will now be described a preferred embodiment of the present invention with reference to the accompanying drawings. Referring to FIGS. 1 and 2, reference numeral 21a and 21b designate respectively lower and upper projecting flanges on a front bracket 1, and 22a is a lower mounting piece having bosses 41a, 41b at opposite ends thereof, each being provided with a bore 31a, 31b, respectively for the mounting of the alternator to an engine. The lower mounting piece 22a is fastened to the lower flange 21a of the front bracket 1 at one end thereof with a bolt 10, and is also fastened to the flange 8 of the rear bracket 6 at the other end thereof with another bolt 10 through a bush 9. An upper mounting piece 22b having a boss 41c provided with a mounting bore 31c is fastened to the upper flange 21b of the front bracket 1 with another bolt 10.

In the structure described above, the lower mounting piece 22a with attachment bosses 41a, 41b and the upper mounting piece 22b with an attachment boss 41c are separate from the brackets 1 and 6, respectively. This permits brackets 1 and 6 to be manufactured always with constant length and thickness without the occurrence of blisters or inverted blisters in the casting process, even when the mounting pitch between the bosses 41a and 41b is excessively long, which contributes to an improvement in the mechanical strength of the brackets. The pieces 22a, 22b are manufactured independently of the brackets 1, 6 without encountering problems involving different in machining directions, resulting in an increase in efficiency and accuracy of machining. Further, it is required to replace only the mounting pieces 22a, 22b with respective bosses with those of other sizes if the corresponding mounting pitches at the engine site are different, and this contributes to the increase in productivity.

Figure 3:
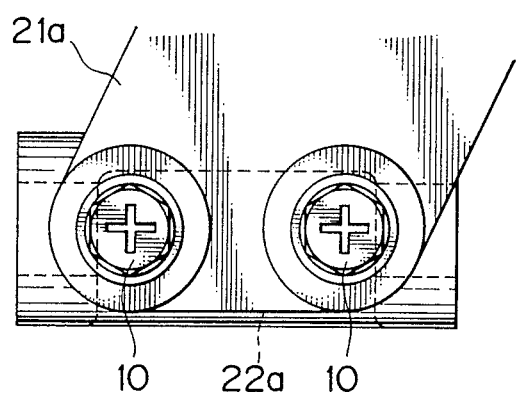
FIG. 3 is a side view of a second example of a vehicle alternator according to the present invention.
Figure 4:
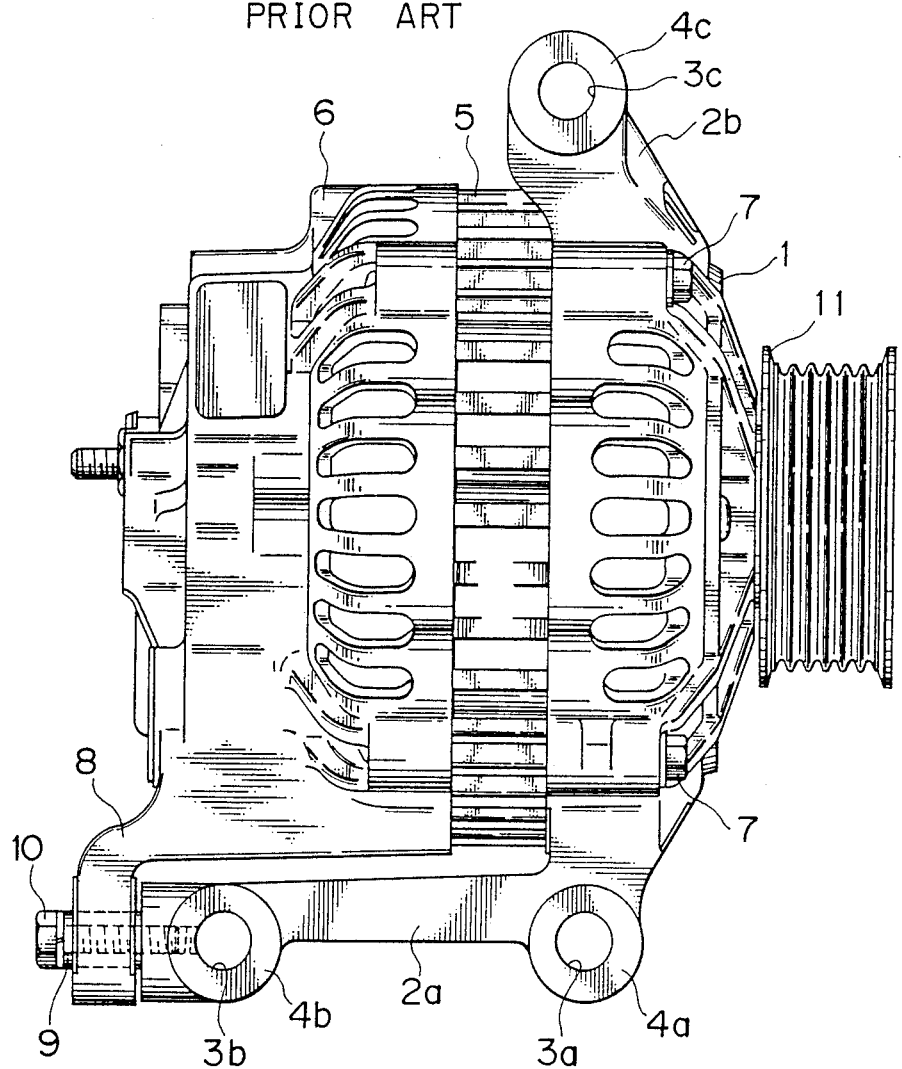
FIG. 4 is a front view of a vehicle alternator according to the prior art.

FIG. 3 shows a second embodiment of the present invention which is different from the first embodiment in that the lower piece 22a is fastened at both ends with two bolts 10 and also the upper piece 22b with two bolts 10 for a more firm attachment, instead of just one bolt 10 as described in the first embodiment. Three or more bolts 10 may be used for similar purpose.

As described above, independent pieces formed separately from alternator brackets and respectively having bosses are used for the attachment of the alternator to the engine, and this simplifies the construction of the brackets and the casting thereof accompanied by no occurrence of blisters or inverted blisters resulting in an increased in mechanical strength. Alternator brackets and mounting pieces can be machined individually in the same direction, contributing to improved efficiency and accuracy of machining. In addition, the replacement of mounting pieces only is required to meet a different mounting pitch at the engine site, reflecting more widespread use.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A vehicle alternator for generating alternating current for a motor vehicle, comprising:
   (a) a rotor rotatable with a shaft;
   (b) a stator (5) for firmly holding said rotor therein,
   (c) a first end bracket (1) and a second end bracket (6) individually disposed flanking respective axially front and rear portions of said stator, said first and second end brackets having integral, radially outwardly projecting flange means including a pair of flanges (8, 21a) on respective opposite ends of said brackets and facing each other in an axially parallel direction, and a further flange (21b) on an end of one of said brackets diametrically opposite one of said pair of flanges;
   (d) a pulley (11) firmly attached to one end of said rotatable shaft of said rotor, and adapted to be connected to an engine through a belt for rotational driving by said engine; and
   (e) mounting means for firmly attaching said alternator to said engine via said bracket flanges, said mounting means including a first, elongate mounting member (22a) fixedly disposed between said pair of flanges and embodying means for attaching said first mounting member to said engine, and a second mounting member (22b) fixed to said further flange and similarly embodying means for attaching said second mounting member to said engine, said mounting members being exchangeable for different mounting members to accommodate different engine dimensional requirements.

2. A vehicle alternator as claimed in claim 1, wherein said mounting means are cast independently of said brackets.

3. A vehicle alternator as claimed in claim 2, wherein said mounting members have attachment bosses with attachment holes oriented perpendicular to the alternator axis, said elongate mounting member being provided with said attachment bosses (41a, 41b) at opposite longitudinal ends for connecting said end brackets to each other at said pair of flanges thereof, whereby said end brackets are firmly connected to each other regardless of the pitch therebetween.

4. A vehicle alternator as claimed in claim 3, wherein said elongate mounting member is firmly attached at the ends thereof to said pair of flanges of said brackets by a plurality of fastening bolts (10).

* * * * *